United States Patent [19]

Hoffmann et al.

[11] Patent Number: 5,136,217
[45] Date of Patent: Aug. 4, 1992

[54] METHOD FOR SWITCHING CURRENT TO SUCCESSIVE SECTIONS OF THE STATOR OF A LONG LINEAR MOTOR

[75] Inventors: Bernhard Hoffmann, Starnberg; Bernhard Nipper, Brunswick; Dieter Wolff, Goslar, all of Fed. Rep. of Germany

[73] Assignee: Magnet-Bahn GmbH, Starnberg, Fed. Rep. of Germany

[21] Appl. No.: 697,340

[22] Filed: May 9, 1991

[30] Foreign Application Priority Data

May 9, 1990 [DE] Fed. Rep. of Germany ....... 4014848

[51] Int. Cl.⁵ .......................... H02K 41/00; H02H 3/33
[52] U.S. Cl. ........................................ 318/135; 361/5; 361/3
[58] Field of Search .............. 318/135; 310/12; 361/2, 361/3, 4, 5, 6, 7

[56] References Cited

U.S. PATENT DOCUMENTS

| | | | |
|---|---|---|---|
| Re. 33,314 | 8/1990 | Cowles | 318/98 |
| 4,348,618 | 9/1982 | Nakamura | 318/38 |
| 4,525,762 | 6/1985 | Norris | 361/13 |
| 4,685,019 | 8/1987 | Needham | 361/2 |
| 4,760,483 | 7/1988 | Kugelman et al. | 361/13 |
| 5,064,998 | 11/1991 | Holling | 219/519 |

Primary Examiner—Steven L. Stephan
Assistant Examiner—Judson H. Jones
Attorney, Agent, or Firm—Spencer, Frank & Schneider

[57] ABSTRACT

When the runner of a linear motor having a long stator which is divided into sections crosses from a first section to a second section, an inverter power supply, which was providing current to the first section via a first switching unit having a relay, is initially gated out. Then the main relay contact paths in the first switching unit are opened and main relay contact paths in a second switching unit for the second section are closed. Only then is the power supply gated in again.

11 Claims, 3 Drawing Sheets

METHOD FOR SWITCHING CURRENT TO SUCCESSIVE SECTIONS OF THE STATOR OF A LONG LINEAR MOTOR

CROSS REFERENCE TO RELATED APPLICATION

This application claims the priority of application, Ser. No. P 40 14 848.3, filed May 9, 1990 in Germany, the subject matter of which is incorporated herein by reference.

BACKGROUND OF THE DISCLOSURE

The present invention relates to a method for supplying current from an inverter power supply via relays to successive sections of the stator of a linear motor.

In a linear electromagnetic drive composed of a long stator and a runner mounted on a vehicle, the long stator is customarily subdivided into several stator sections. The "runner" corresponds to the rotor of a rotary motor. For reasons of economy, energy from a constant frequency inverter power supply is conveyed only to those sections on which vehicles are actually located at any given time. In the past, it has been customary to employ several inverter power supplies to feed successive stator sections and to switch the respective sections in and out when the vehicle was getting ready to enter a particular section or had just left it. However, this method requires a plurality of inverter power supplies and increased costs for cabling. Moreover, Federal Republic of Germany Offenlegungsschrift (published but unexamined patent application) 3,317,964.7 discloses the supplying of several successive stator sections by means of a single constant frequency inverter power supply in such a manner that an individual section under load is switched on or off by way of hybrid relays when the vehicle has just entered the section or left it, respectively. The drawback here is the high cost for the complicated hybrid relays.

SUMMARY OF THE INVENTION

It is therefore an object of the invention to supply current from a single constant frequency inverter power supply to several successive sections of a long stator using relays that are simply constructed and economical.

This and other objects that will become apparent in the ensuing detailed description can be attained by a method for supplying current to stator sections which is characterized in that, upon a change of the runner from a first stator section to a second stator section, the inverter power supply is initially gated out; then the main relay contact paths for the first stator section are opened and the main relay contact paths for the second stator section are closed; and only then is the inverter power supply gated in again.

If relay coils are actuated by alternating current, their response times are of different lengths depending on the amplitude of the current at the moment in view of its phase position. This is the reason that, in the present invention, the relay coils are preferably operated with a high amplitude direct current so as to realize the shortest possible and uniform response times. For this purpose, a sufficiently large capacitor is charged to the peak value of the alternating supply voltage. A turn-on instruction causes the capacitor voltage to be applied across the relay coil so as to quickly attract the relay armature; at the same time, a direct voltage source is switched in to hold the armature.

In normal operation, the contact paths which supply current to the stator sections are actuated only if the inverter power supply has been gated out, so that the switching takes place without current. If, however, the supply current to the relay coils is interrupted while current from the inverter power supply continues to flow, the just switched-on contacts will inevitably drop off and an arc will be generated. Therefore, an arc monitoring arrangement is preferably incorporated which, as soon as an arc is generated, gates out the inverter power supply and thus prevents destruction of the contacts.

DESCRIPTION OF THE PREFERRED EMBODIMENT

Figure 1:
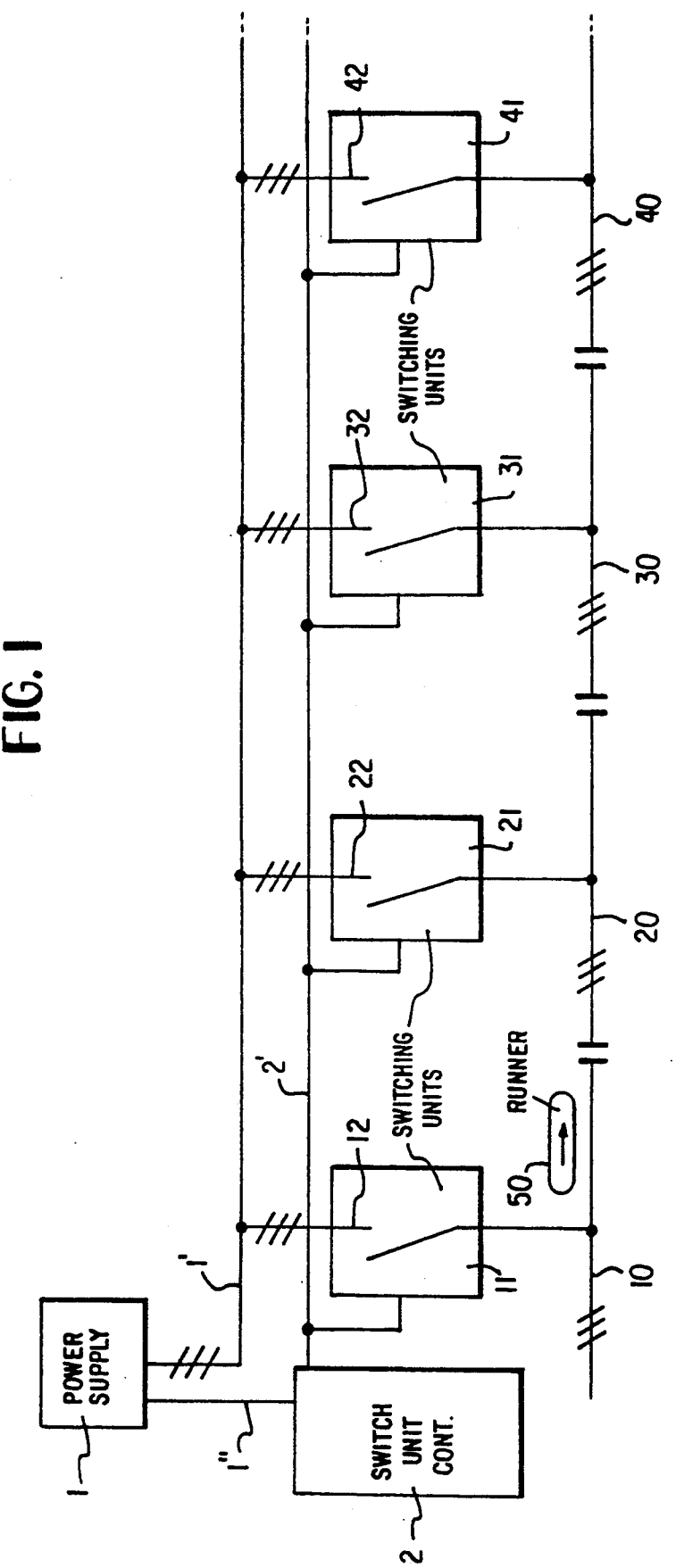
FIG. 1 schematically illustrates circuitry for supplying current to a long stator line composed of a plurality of successive stator sections in accordance with the present invention.

FIG. 1 illustrates a system for feeding electrical current to a linear motor having a long stator which is divided into successive stator sections 10, 20, 30, 40, and so forth. The runner 50 of the motor (corresponding to the rotor of a rotary induction motor) is mounted on a vehicle (not shown) which travels along the stator. The source of the current is an inverter power supply 1 which provides three-phase current to a distribution bus 1'. In FIG. 1, the three hash marks across bus 1'(and elsewhere in the drawing) indicate three separate conductors, one for each phase. Power supply 1 may be a pulse inverter, which generates three stair-step type outputs that simulate sine waves and that are equally offset in phase from one another. Power supply 1 comprises digital circuitry (not shown), including gates which are responsive to a control signal on control line 1" to selectively isolate bus 1' from the electrical power.

Switching unit 11 provides triple main relay contact paths 12 that can be selectively opened or closed. As used herein, a relay "contact path" includes a fixed relay contact and an associated movable relay contact which cooperates with it, and "triple" means that three fixed contacts and three movable contacts provide three such contact paths. Similarly, switching units 21, 31, and 41 are respectively provided with triple main relay contact paths 22, 32, and 42.

By means of switching units 11, 21, 31, and 41 and their respective triple main relay contacts 12, 22, 32, and 42, all of the sections 10, 20, 30, and 40 can be supplied with current at the frequency and phase position require by the runner 50. The switching units 11, 21, 31, and 41 are controlled by a switching unit controller 2, which also provides the control signal for power supply 1. The switching units 11, 21, 31, and 41 are connected to controller 2 by a bus 2', which has individual conductors to each of the switching units. The controller 2 obtains additional information about the position of the runner 50 from a pole position detection system (not illustrated).

Let it now be assumed, for example, that a vehicle having runner 50 is disposed on section 10 and is moving toward section 20. Power supply 1 supplies section 10 with the necessary current by way of the closed switching unit 11, while the remaining switching units 21, 31, and 41 are open. If switching unit controller 2 receives the information that the vehicle is ready to leave section 10 and is about to enter section 20, controller 2 instructs switching unit 11 to open its main contact paths 12 and then, according to the invention, gates out inverter power supply 1 and instructs switching unit 21 to close its main contact paths 22. Thereafter, controller 2 permits the output from power supply 1 to appear again. Thus, the switching units are without a current load and conventional three-phase relays can be employed in the switching units, since the relays need only carry the current but need not switch it (the current from the power supply 1 may involve frequencies down to almost zero). A prerequisite for such use is rapid switching and only short-term gating-out of the power supply 1, so that the vehicle does not perform any jerky movements.

The inverter power supply 1 can be gated in and out within a few milliseconds. Care must therefore be taken that the switching units are switched quickly and in a reproducible manner. To ensure that the switching units are switched operated without load, a certain short period of time must be provided between the gating out of power supply 1 and the opening of the main relay contact paths of the switching unit for the section just left by the vehicle.

The same applies for the switching on of the switching unit for the next section and the subsequent gating in of the power supply 1. This time sequence can be realized, for example, using electronic time delay members.

Figure 2:
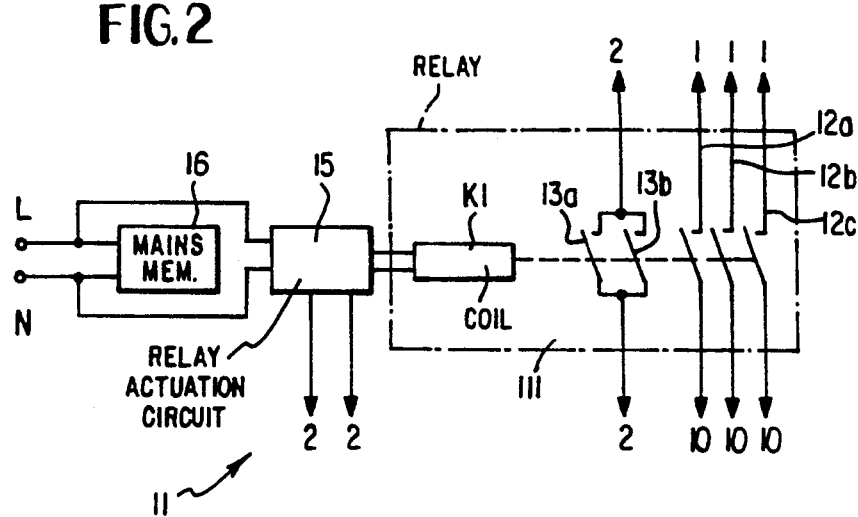
FIG. 2 illustrates the structure of a particularly preferred switching unit that can be used in the arrangement of FIG. 1.

The simple mechanical arrangement shown in FIG. 2 represents a particularly preferred embodiment of a switching unit (switching unit 11 is depicted, but the others have the same configuration) which can be employed to perform the method of the invention. Switching unit 11 includes a three-phase relay 111 having main relay contact paths 12$a$, 12$b$ and 12$c$ (which together form the triple contact paths 12 shown in FIG. 1). Each of contact paths 12$a$, 12$b$, and 12$c$ conducts one phase of the current between power supply 1 and stator section 10. Relay 111 also includes auxiliary contact paths 13$a$ and 13$b$ and a relay coil K1. Contact paths 13$a$ and 13$b$ include late closing contacts. When the relay 111 drops off, the late closing contact paths 13 (that is, the contact paths 13$a$ and 13$b$) are opened before main contact path 12, and they are closed after main contact paths 12 when the relay armature (not shown) is attracted. Switching unit 11 further includes a relay actuating unit 15 and a mains member 16.

As has previously been noted, switching units 21, 31, and 41 have the same configuration as switching unit 11. In the following discussion, their reference numerals will correspond to those of switching unit 11 except that the first digit of the designated switching unit will be included in the reference number a component. For example, switching unit 21 has auxiliary contact paths 23$a$ and 23$b$ and a relay coil K2.

Figure 3:
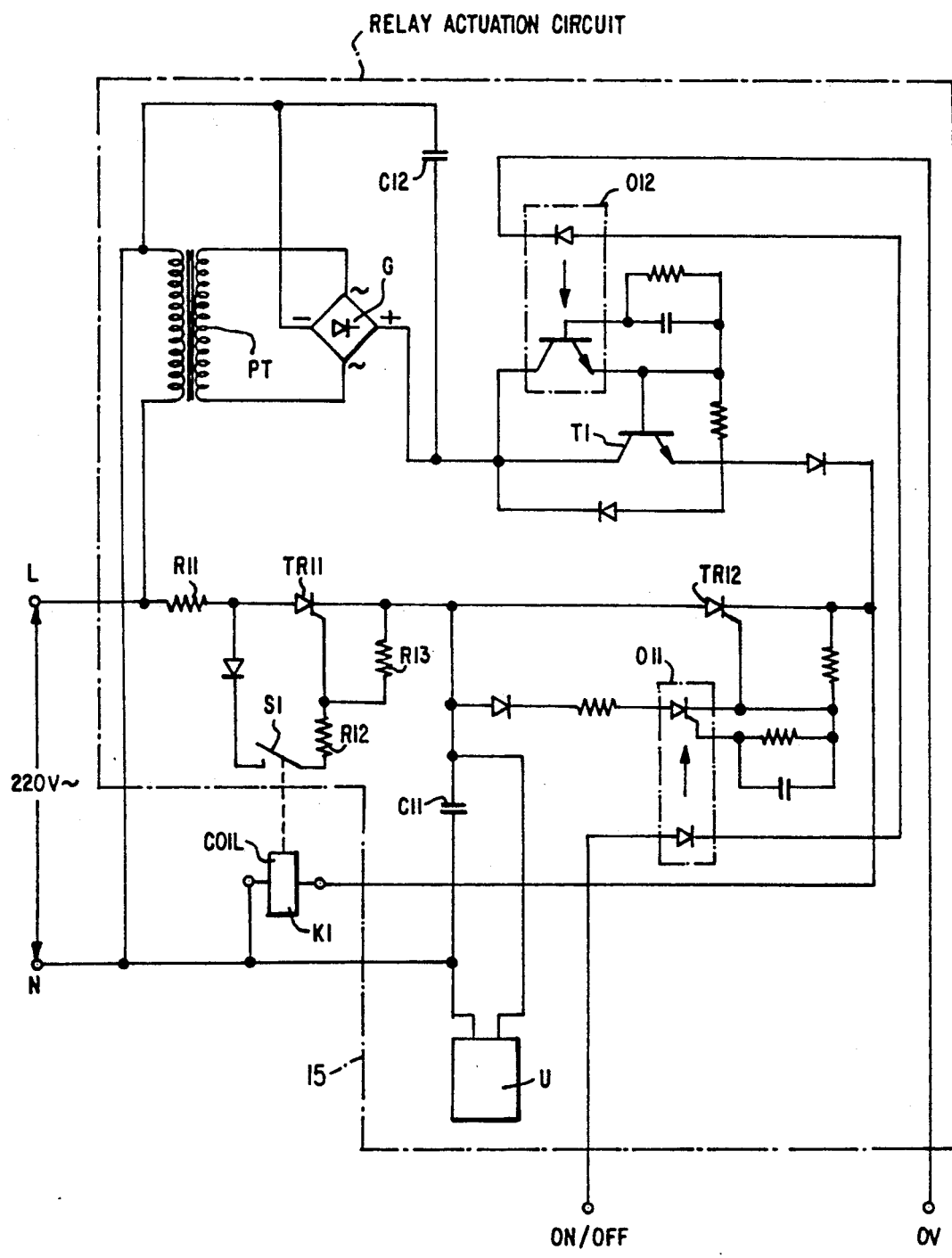
FIG. 3 illustrates one possible configuration of the relay actuation circuit of FIG. 2.

FIG. 3 shows the preferred relay actuation circuit 15 for switching unit 11, and the relay coil K1. By way of a resistor 11 and a thyristor TR11, a turn-on capacitor C11 is charged to the peak of the supply voltage. Furthermore, power transformer PT provides rectifier G with AC power and rectifier G generates a direct voltage which is smoothed by means of a capacitor C12. If the switching unit controller 2 applies a positive turn-on voltage via bus 2' (see FIG. 1) to the on/off terminal, optocouplers 011 and 012 switch thyristor TR12 and transistor T1 to the conductive state. Relay coil K1 thereupon receives the voltage across capacitor C11 and attracts the relay armature (not shown), which is thereafter held by the direct voltage from rectifier G. If relay coil K1 is at full attraction, switch S1 is opened so that the turn-on capacitor C11 is no longer charged via thyristor TR11. However the coil K1 is supplied with direct current from rectifier G, so the relay armature remains attracted as long as the positive turn-on voltage is present across the on/off terminal. A monitoring circuit prevents the armature from being attracted if turn-on capacitor C11 is not fully charged.

Figure 4:
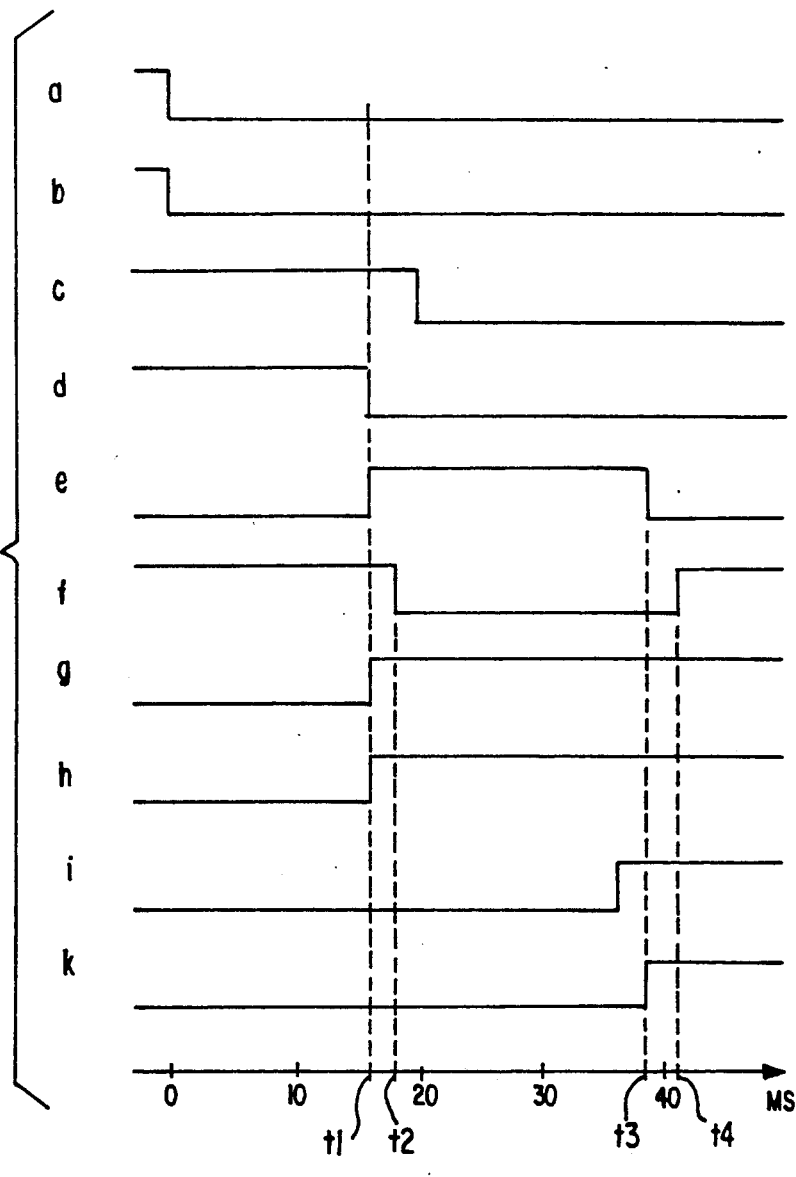
FIG. 4 illustrates the time sequence of various signals during a change of stator sections by means of the system shown in FIG. 2.

FIG. 4 shows the time sequence for a change of stator sections, for example from section 10 to 20. The individual curves indicate the following:

(a) on/off signal from switching unit controller 2 for switching unit 11;
(b) current in relay coil K1 in switching unit 11;
(c) switching state of main relay contact paths 12 in switching unit 11;
(d) switching state of late closing contact paths 13 in switching 11;
(e) switching of power supply 1 by controller 2;
(f) current from power supply 1 to stator sections 10 or 20;
(g) on/off signal from controller 2 for switching unit 21;
(h) current in relay coil K2 in switching unit 21;
(i) switching state of main relay contact paths 22 in switching unit 21; and
(k) switching state of late closing contact paths 23 in switching unit 21.

Let it be assumed that a vehicle is ready to leave section 10 and enter section 20. The descending edge of the on/off signal (FIG. 4$a$) for switching unit 11 causes the current to relay coil K1 to be interrupted (FIG. 4$b$). Approximately 16 ms later, late closing contact paths 13 open (FIG. 4$d$) at a time t1. Shortly thereafter (FIG. 4$c$) the main contact paths 12 are opened to disconnect stator section 10. Switch unit controller 2 senses the opening of late closing contact paths 13 and emits an instruction to power supply 1 at time t1 (FIG. 4$e$) to gate the current supplied to the switching units. A short time later, at a time t2, the current ceases to flow (FIG. 4$f$). Also, when late closing contact paths 13 are opened at time t1, controller 2 emits an ON-instruction to switching unit 21 (FIG. 4$g$). Accordingly, the current for relay coil K2 in switching unit 21 is turned on (FIG. 4$h$) and the relay armature in switching unit 21 is attracted. Approximately 20 ms later, the main relay contact paths 22 in switching unit 21 are closed (FIG. 4$i$) and then, at a time t3, late closing contact paths 23 in switching unit 21 follow (FIG. 4$k$). At this time t3, a gate-in instruction is given for power supply 1 (FIG. 1$e$) and approximately 2 ms later, at a time t4, power supply 1 furnishes current through the closed main contact paths 22 to section 20 (FIG. 4$f$). Thus it is ensured that the time during which the long stator is without current is only about 20 ms; simultaneously it is possible to switch the main relay contact paths without load. The procedure is the same for subsequent section changes.

Box U in FIG. 3 represents a well-known voltage supervision circuit. This circuit prevents the relay from actuating if turn-on capacitor 11 is not fully charged.

It will be understood that the above description of the present invention is susceptible to various modifications, changes, and adaptations, and the same are intended to be comprehended within the meaning and range of equivalents of the appended claims.

What is claimed is:

1. A method for successively energizing conductors disposed along a path as an object, which moves along the path while drawing electrical power from the conductors, crosses between a first one of the conductors and a second one of the conductors, comprising:
   (a) turning off a means for supplying electrical power to the first one of the conductors while the means is electrically connected to the first one of the conductors;
   (b) interrupting the electrical connection between the first one of the connectors and the means after step (a) has been conducted;
   (c) electrically connecting the second one of the conductors to a means for supplying electrical power to the second one of the conductors while the means for supplying electrical power to the second one of the conductors is turned off; and
   (d) turning on the means for supplying electrical power to the second one of the conductors after step (c) has been conducted,
   wherein steps (c) and (d) are conducted by actuating a relay having at least one main relay contact path which closes to electrically connect the second one of the conductors to the means for supplying power to the second one of the conductors,
   wherein the relay additionally has at least one late closing contact path which closes after the at least one main relay contact path closes, and
   wherein step (d) comprises detecting when the at least one late closing contact path closes.

2. The method of claim 1, wherein the means for supplying electrical power to the first one of the conductors and the means for supplying electrical power to the second one of the conductors comprise a common power source, and wherein steps (a) and (d) are respectively conducted by turning the common power source off and on.

3. The method of claim 1, wherein the relay has a relay coil, and wherein the step of actuating a relay comprises discharging a turn-on capacitor through the relay coil to create a current surge through the relay coil and connecting a rectified power source across the relay coil to thereafter maintain the current through the relay coil at a reduced level, the turn-on capacitor being electrically isolated from the rectified power source until the relay is actuated.

4. The method of claim 1, wherein the first one of the conductors is part of a first stator section for a linear motor, wherein the second one of the conductors is part of a second stator section for the linear motor, and wherein the object is a runner for the linear motor, the runner magnetically interacting with the first and second stator sections as it moves along the path.

5. A method for supplying current from a power source to a linear motor having a long stator which is divided into sections and having a runner which moves along the stator, comprising the steps of:
   (a) turning the power source off as the runner is changing from a first stator section to an adjacent second stator section;
   (b) opening main relay contact paths of a first relay which is connected to the power source and the first stator section in order to electrically disconnect the power source from the first stator section, and closing main relay contact paths of a second relay which is connected to the power source and the second stator section in order to electrically connect the power source to the second stator section; and
   (c) then turning the power source on again,
   wherein the first relay additionally has at least one auxiliary contact pat which opens a short time before the main relay contact paths of the first relay open, and
   wherein step (a) is conducted by turning the power source off when the at least open auxiliary contact path opens.

6. The method of claim 5, wherein the power source is an inverter power supply, and wherein steps (a) and (c) are respectively conducted by gating the power supply out and in.

7. The method of claim 5, wherein the second relay additionally has at least one auxiliary contact path which closes a short time after the main relay contact paths of the second relay close, and wherein step (c) is conducted by turning the power source on when the at least one auxiliary contact path of the second relay closes.

8. A method for supplying current from a power source to a linear motor having a long stator which is divided into sections and having a runner which moves along the stator, comprising the steps of:
   (a) turning the power source off as the runner is changing from a first stator section to an adjacent second stator section;
   (b) opening main relay contact paths of a first relay which is connected to the power source and the first stator section in order to electrically disconnect the power source from the first stator section, and closing main relay contact paths of a second relay which is connected to the power source and the second stator section in order to electrically connect the power source to the second stator section; and
   (c) then turning the power source on again,
   wherein the second relay has a coil, and
   wherein step (b) comprises supplying the coil with direct current to obtain a uniform response and rapid closing of the main relay contact paths of the second relay.

9. The method of claim 8, further comprising the step of charging a turn-on capacitor to the peak value of an AC supply voltage, and wherein the step of supplying the coil with direct current comprises electrically connecting the capacitor across the coil.

10. The method of claim 9, wherein the step of supplying the coil with direct current further comprises supplying the coil with direct current from a rectifier to keep the main relay contact paths of the second relay closed.

11. A method for supplying current from a power source to a linear motor having a long stator which is divided into sections and having a runner which moves along the stator, comprising the steps of:

(a) turning the power source off as the runner is changing from a first stator section to an adjacent second stator section;
(b) opening main relay contact paths of a first relay which is connected to the power source and the first stator section in order to electrically disconnect the power source from the first stator section, and closing main relay contact paths of a second relay which is connected to the power source and the second stator section in order to electrically connect the power source to the second stator section;
(c) then turning the power source on again;
(d) detecting whether an arc is generated at the main relay contact paths of the first or second relays; and
(e) turning the power source off if an arc is detected.

* * * * *